US007933334B2

(12) United States Patent
Kanehara (10) Patent No.: US 7,933,334 B2
(45) Date of Patent: Apr. 26, 2011

(54) IMAGE ENCODER AND METHOD THEREOF, COMPUTER PROGRAM OF IMAGE ENCODER, AND MOBILE TERMINAL

(75) Inventor: Fumikazu Kanehara, Tokyo (JP)

(73) Assignee: NEC Corporation, Tokyo (JP)

( * ) Notice: Subject to any disclaimer, the term of this patent is extended or adjusted under 35 U.S.C. 154(b) by 1587 days.

(21) Appl. No.: 11/254,666

(22) Filed: Oct. 21, 2005

(65) Prior Publication Data
US 2006/0088103 A1    Apr. 27, 2006

(30) Foreign Application Priority Data

Oct. 26, 2004    (JP) ................................. 2004-310763

(51) Int. Cl.
*H04N 7/12*    (2006.01)
(52) U.S. Cl. ............... 375/240.16; 382/238; 375/240.12
(58) Field of Classification Search ............ 375/E7.129, 375/240.16; 382/232, 233, 236, 239, 268
See application file for complete search history.

(56) References Cited

U.S. PATENT DOCUMENTS

| 5,701,160 | A  | * | 12/1997 | Kimura et al. | ........... | 375/240.14 |
| 5,883,976 | A  |   | 3/1999  | Ohsawa        |            |            |
| 6,493,390 | B2 | * | 12/2002 | Miyaji et al. | ............. | 375/240.16 |
| 6,970,509 | B2 | * | 11/2005 | Xiang et al.  | ............. | 375/240.16 |
| 7,260,148 | B2 | * | 8/2007  | Sohm          | ...................... | 375/240.16 |
| 7,369,707 | B2 | * | 5/2008  | Sakaguchi et al. | ............ | 382/239 |
| 2005/0259879 | A1 | * | 11/2005 | Hellman     | ....................... | 382/239 |
| 2006/0029134 | A1 | * | 2/2006  | Winder et al. | ............ | 375/240.12 |

FOREIGN PATENT DOCUMENTS

| CN | 1535027 A | 10/2004 |
| EP | 0 876 058 A1 | 11/1998 |
| JP | 8-186823 | 7/1996 |
| JP | 2002-232886 A | 8/2002 |
| JP | 2005-348280 | 12/2005 |
| WO | WO 03/101117 A1 | 12/2003 |

OTHER PUBLICATIONS

Pan et al., "A Directional Field Based Fast Intra Mode Decision Algorithm for H.264 Video Coding," IEEE International Conference on Multimedia and Expo (ICME), 2004, 14 Sheets.

* cited by examiner

*Primary Examiner* — Gregory M Desire
(74) *Attorney, Agent, or Firm* — Foley & Lardner LLP (57) ABSTRACT

The present invention provides an image coding method comprising: selecting prediction modes from among prescribed plurality of prediction modes based on processed blocks, the number of selected prediction modes being less than the number of said prescribed plurality of prediction modes; predicting a pixel of a block in an input frame image based on selected prediction modes; calculating a difference between said predicted pixel value and a pixel value of a block in an input frame; determining a coding mode based on the result of said calculation process, said determined coding mode being used for said image coding method.

And the present invention also provides an encoding circuit, encoding program, a mobile terminal, an encoding and decoding circuit relevant to the image encoding method above.

28 Claims, 8 Drawing Sheets

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

FIG. 6

(a) MODE 0

(b) MODE 1

(c) MODE 2

(d) MODE 3

(e) MODE 4

(f) MODE 5

(g) MODE 6

(h) MODE 7

(i) MODE 8

| BLOCK A / BLOCK B | MODE 0 | MODE 1 | MODE 2 | MODE 3 | MODE 4 | MODE 5 | MODE 6 | MODE 7 | MODE 8 |
|---|---|---|---|---|---|---|---|---|---|
| MODE 0 | – | 4 | 5, 7 | 7 | 5 | – | 4, 5 | – | 3, 6 |
| MODE 1 | 4 | – | 6, 8 | 0, 8 | 6 | 4, 6 | – | 0, 5 | – |
| MODE 2 | 5, 7 | 6, 8 | 0, 1 | 7 | 5, 6 | 0, 4 | 1, 4 | 0, 3 | 1 |
| MODE 3 | 7 | 0, 8 | 7 | – | 0 | 0, 7 | 0, 8 | – | 0, 6 |
| MODE 4 | 5 | 6 | 5, 6 | 0 | – | – | – | 0, 5 | 1, 6 |
| MODE 5 | – | 4, 6 | 0, 4 | 0, 7 | – | – | 4 | 0 | 6 |
| MODE 6 | 4, 5 | – | 1, 4 | 0, 8 | – | 4 | – | 5 | 1 |
| MODE 7 | – | 0, 5 | 0, 3 | – | 0, 5 | 0 | 5 | – | 5, 6 |
| MODE 8 | 3, 6 | – | 1 | 0, 6 | 1, 6 | 6 | 1 | 5, 6 | – |

506 PREDICTION MODE TABLE

IMAGE ENCODER AND METHOD THEREOF, COMPUTER PROGRAM OF IMAGE ENCODER, AND MOBILE TERMINAL

BACKGROUND OF THE INVENTION

1. Field of the Invention

The present invention relates to the field of the technology of coding digital image data such as a frame image. In particular, the present invention relates to the field of the image coding technology of carrying out motion prediction in an identical frame (intra prediction).

2. Description of the Related Art

As related technologies, the following patent documents are found for example.

That is, JP-Laid Open Patent No. 232886/2002 (Paragraphs 48 and 49, and FIG. 5) proposes the technology of referring to the coding modes of already coded blocks existing in the vicinity of a block to be coded based on the statistical properties thereof when the block to be coded is coded in an image encoder.

Further, JP-Laid Open Patent No. 186823/1996 (Paragraphs 37 and 43, and FIG. 17) proposes the technology of, when image data is coded: selecting an optimum difference value generating method (a coding mode) in each block of 4×4 pixels to be coded; generating a difference value by the selected difference value generating method; and then coding the generated difference value.

Moving picture compression technologies such as MPEG (Moving Picture Experts Group) 2, MPEG 4 and others have heretofore been adopted in various kinds of image processors that handle moving pictures.

In the moving picture compression technologies (moving picture coding technologies, so-called codec) such as MPEG 2, MPEG 4 and others, each pixel that composes a frame image (hereunder referred to simply as "frame" occasionally) is not actually recorded. In such moving picture compression technologies, in order to reduce the amount of moving picture data, the image compression is carried out based on the result obtained by predicting where an image block contained in a certain frame moves in other subsequent frames (namely, with the lapse of time).

As a technology of expanding such conventional moving picture compression technologies, H.264/AVC (Advanced Video Codec) has been a focus of constant attention in recent years. H.264/AVC is a technology cooperatively developed by ITU-T (International Telecommunication Union-Telecommunication Standardization Sector) and ISO (International Organization for Standardization)/IEC as a moving picture compression technology which is intended to be an open standard. H.264/AVC codec is also called MPEG 4 AVC.

Even in such H.264/AVC, the basic concept of the image compression technology thereof is in common with that of the aforementioned conventional moving picture compression technologies such as MPEG2 or MPEG4. A difference is that the function called "sub-macro block splitting" is adopted in H.264/AVC. Thereby, compression processing which is more flexible than the conventional moving picture compression technologies can be realized with a less amount of data. Here, a sub-macro block means a block of a smaller splitting unit (for example, a block of 4×4 pixels) that composes a macro block (for example, a block of 16×16 pixels).

Further, in H.264/AVC, by adopting the function called "intra prediction," motion prediction in an identical frame that has not been realized in the aforementioned conventional moving picture compression technologies is realized.

In the meantime, there are two main types of methods for the intraframe prediction of H.264. One is a method of making prediction for each macro block of 16×16 pixels (hereunder referred to simply as "16×16 macro block") and the other is a method of making prediction for each sub-macro block of 4×4 pixels (hereunder referred to simply as "4×4 block"). Then, in the method of making motion prediction for each 4×4 block, nine modes are defined as the candidates of the prediction result. On the other hand, in the method of making motion prediction for each macro block of 16×16 pixels, four modes are defined as the candidates of the prediction result. Therefore, though it also depends on how the codec is implemented, it is considered that, generally speaking, the motion prediction for each 4×4 block allows a closer prediction but tends to increase the amount of calculation in comparison with the motion prediction for each 16×16 macro block.

SUMMARY OF THE INVENTION

In view of the above situation, an object of the present invention is to reduce the amount of calculation required up to the decision of a coding mode when a frame image is coded by intraframe prediction.

With the aim of attaining the above object, the image coding method according to the present invention is characterized by having the following configuration.

An image coding method according to the present invention comprises selecting prediction modes from among prescribed plurality of prediction modes based on processed blocks, the number of selected prediction modes being less than the number of said prescribed plurality of prediction modes; predicting a pixel of a block in an input frame image based on selected prediction modes; calculating a difference between said predicted pixel value and a pixel value of a block in an input frame; determining a coding mode based on the result of said calculation process, said determined coding mode being used for said image coding method.

Then, in the above case, it is preferable that the prediction modes used for calculation are stored in the table. And It is also preferable that the prediction modes are determined based on the correlation between the processed blocks and the block to be processed for each of the plural types of modes that can be selected as the coding modes of the blocks.

Note that the above object can be attained also with an image encoder corresponding to the image coding method of the above configuration.

Further, the above object can be attained also with: a computer program to realize the image coding method of the above configuration and a device corresponding there to with a computer; and a computer-readable storage medium in which the computer program is stored.

Further, the above object can be attained also with a mobile terminal which has an image encoder corresponding to the image coding method of the above configuration.

Further, the above object can be attained also with a system which has an image encoder corresponding to the image coding method of the above configuration and an image decoder relevant to the image encoder.

By the present invention stated above, it is possible to reduce the amount of calculation required up to the decision of a coding mode when a frame image is coded by intraframe prediction.

That is, firstly in the present invention, prediction modes for the computation of difference on the block to be processed are decided from among prescribed plural types of prediction modes, the prediction modes being to be candidates when the coding mode of the block to be processed is decided in a frame image, based on the already decided coding modes on the processed blocks. Secondly in the present invention, the difference is computed by each of the decided prediction modes and the prediction mode corresponding to the minimum difference among the computed differences is selected as the coding mode of the block to be processed.

As mentioned above, in the present invention, the difference is computed only by the minimum necessary number of prediction modes decided from among prescribed plural types of prediction modes based on the already decided coding modes on the processed blocks. Therefore, it is possible to remarkably reduce the amount of calculation when the coding mode of the block to be processed is decided in comparison with conventional procedures wherein the difference has individually been computed for each of the prescribed plural types of prediction modes.

BRIEF DESCRIPTION OF THE DRAWINGS

FIG. 6(a) to (i) comprises charts explaining the nine modes that are nominated as the candidates when a 4×4 block to be processed is coded;

DETAILED DESCRIPTION OF THE PREFERRED EMBODIMENTS

The present invention is hereunder explained in detail with reference to the drawings based on the embodiment wherein the present invention is applied to a mobile phone, which is a representative mobile terminal, as an example.
(Hardware Configuration of Mobile Phone)

Figure 1:
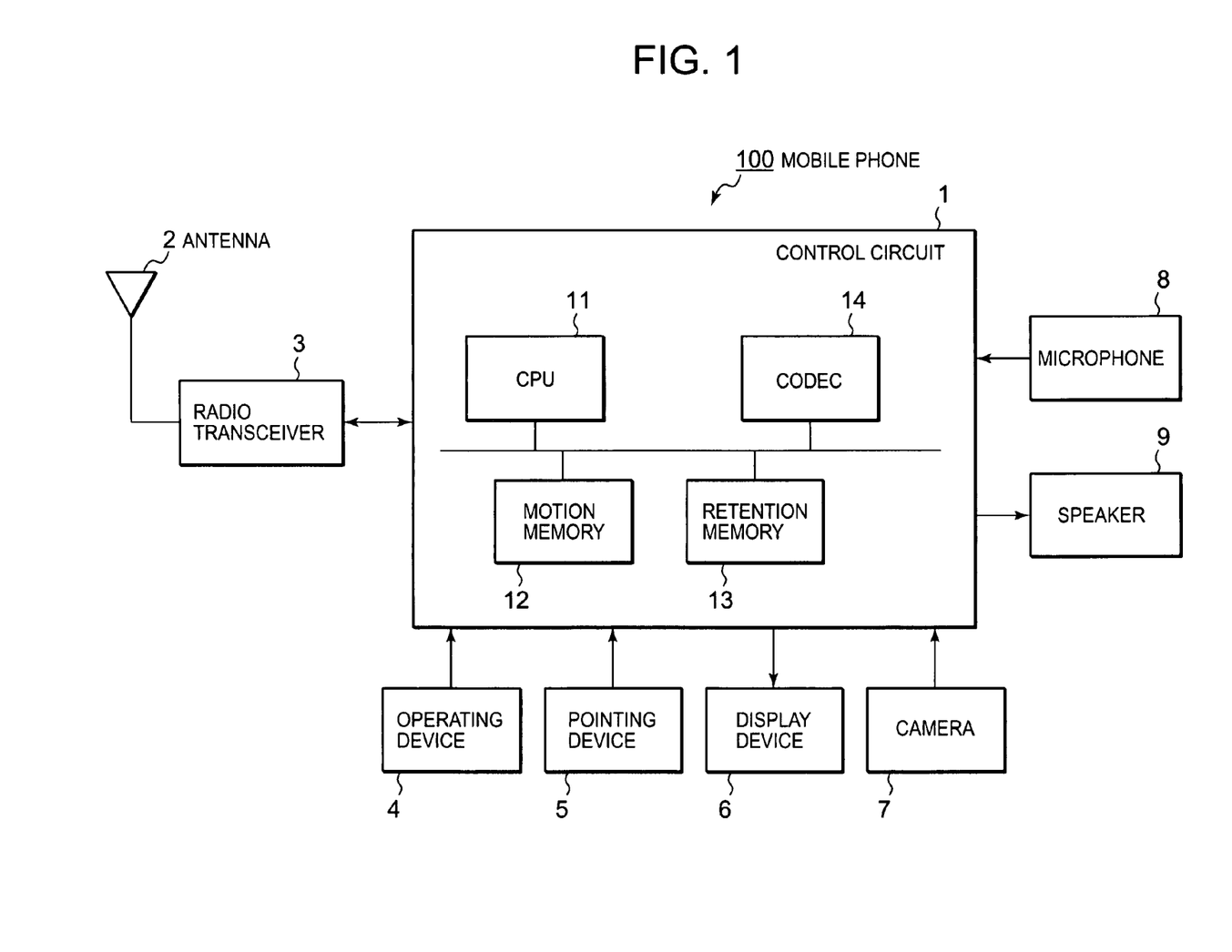
FIG. 1 is a block diagram exemplifying the configuration of a mobile phone to which the present invention is applicable.

Firstly, an example of the configuration of the hardware of a mobile phone according to the present embodiment is explained. FIG. 1 is a block diagram exemplifying the configuration of a mobile phone (including a cellular phone) to which the present invention is applicable.

In the present embodiment, a mobile phone 100 roughly includes a control circuit 1, an antenna 2, a radio transceiver 3, an operating device 4, a pointing device 5, a display device 6, a camera 7, a microphone 8, and a speaker 9.

The control circuit 1 is provided with a CPU (Central Processing Unit) 11, a motion memory 12, a retention memory 13, a codec 14, and hardware not shown in the figure. In the control circuit 1, the CPU 11 controls each part of the mobile phone 100 by running a group of programs read out from the retention memory 13.

More specifically, the CPU 11 in the control circuit 1 makes an incoming alert in the case by detecting the call number of the mobile phone from among the signals demodulated in the radio transceiver 3. Further, the CPU 11 in the control circuit 1 carries out voice communication using the microphone 8 and the speaker 9, the transceiving of mails, and the communication of data including images. These functions are realized by processing audio signals and digital data signals in the CPU 11.

Furthermore, the CPU 11 in the control circuit 1 follows instructions input by a user through the operating device 4, e.g. ten-keys, and the pointing device 5 when the CPU 11 runs a group of programs read out into the motion memory 12.

In addition, the CPU 11 in the control circuit 1 controls the operation of the codec 14 in order to code an image taken by the camera 7 and decode compressed image data. Here, the image includes a moving picture.

The camera 7 inputs the frame image taken in accordance with the operation instructions of the CPU 11 into the control circuit 1.

The codec 14 compresses the image (frame image) taken with the camera 7 into compressed image data conforming to a prescribed coding data format (H.264/AVC format) (the details are explained later). The compressed image data output from the codec 14 is temporarily stored in the motion memory 12.

Further, the codec 14 decodes the compressed image data into uncompressed digital image data per frame. The compressed image data to be decoded here can be the compressed image data obtained from outside the mobile phone 100 or the compressed image data stored in the mobile phone 100 after coded with the codec 14.

In accordance with the operation instructions of the CPU 11, The display device 6 displays various inputted contents linked to the operation of a user to the operating device 4 and the pointing device 5. Further, the display device 6 can display images or moving pictures taken by the camera 7, and images or moving pictures obtained from outside and others.

The motion memory (for example, RAM: Random Access Memory) 12 is used for storing data temporarily during the CPU 11 works.

The retention memory 13 is a non-volatile memory (flash memory or the like) and retains, for example, the operation program of the CPU 11, various kinds of parameters, the call number (caller ID) of the mobile phone, user data (for example, mail documents and telephone numbers), and others.

The antenna 2 sends or receives modulated radio wave.

The radio transceiver 3 demodulates radio wave received from the antenna 2 and modulates digital signals output from the control circuit 1. Further, the radio transceiver 3 has the same functions (ex. amplifying a signal, to receiving a signal) as the radio transceiver of a commonly used wireless communication terminal. The CPU 11 in the control circuit 1 orders the radio transceiver to transmit compressed image data temporarily stored in the motion memory 12 through the radio transceiver 3.

Voice of a user is input into the microphone 8. The speaker 9 outputs voice (sound) to a user.

Here, for the operations, such as data transceiving processing and audio codec processing, which the mobile phone 100 carries out with an external device in the above equipment configuration, now generally used technologies can be applied. Further, for the decoding processing carried out in the codec 14, general procedures based on the H.264/AVC standard can be employed. Hence, detailed explanations in the present embodiment are omitted here.

(Codec 14)

Next, the codec 14 in the control circuit 1 is explained in detail with reference to FIGS. 2 to 9.

Figure 2:
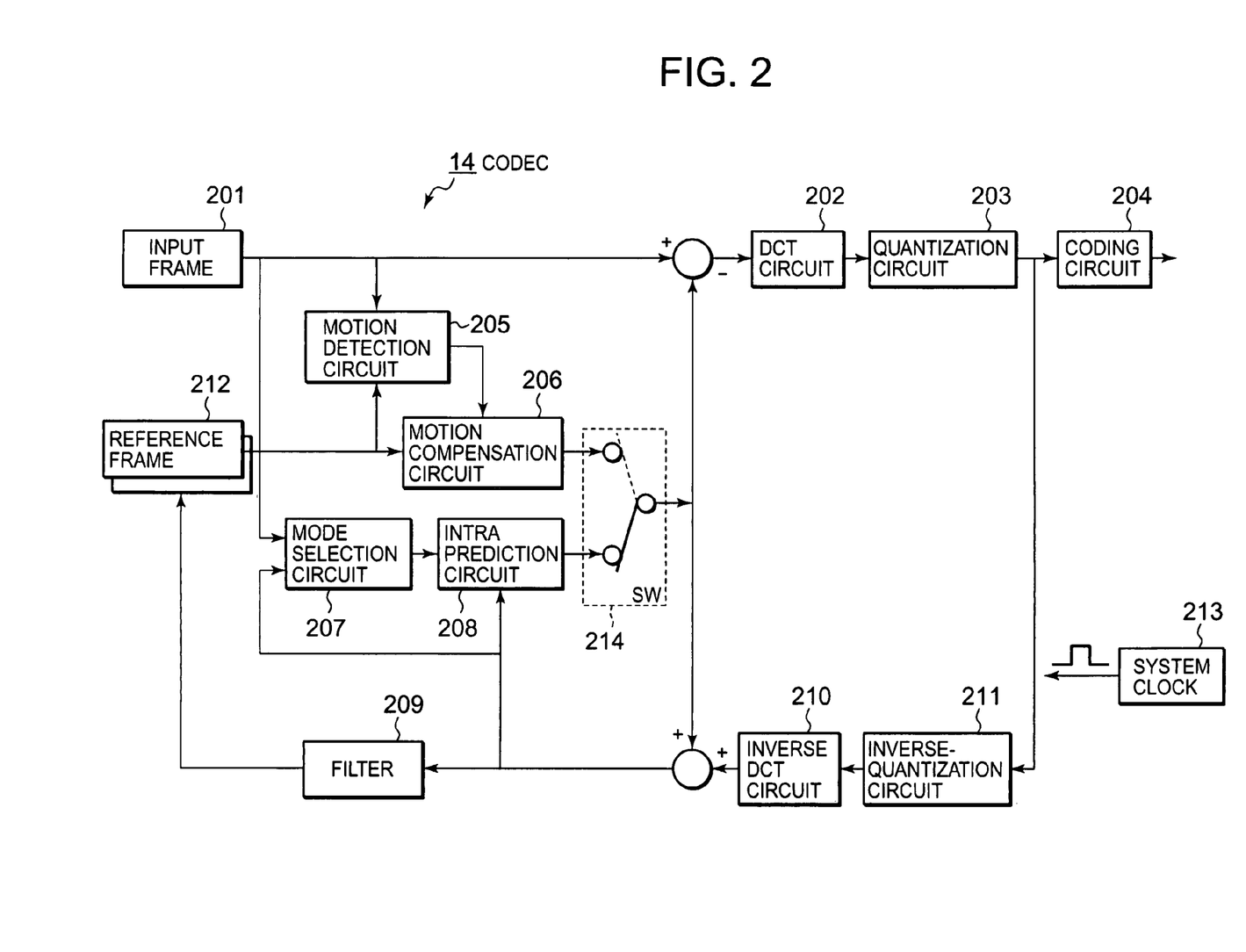
FIG. 2 is a block diagram showing the configuration of a circuit for coding processing in a codec according to an embodiment of the present invention.

FIG. 2 is a block diagram showing the configuration of a circuit for coding processing in a codec circuit according to an embodiment of the present invention. The codec 14 shown in the figure selectively carries out "interframe prediction" and "intraframe prediction (intra prediction)" in an appropriate manner. Here, the interframe prediction is a method of carrying out the motion prediction of an input frame 201 by a reference frame 212. In contrast, the intraframe prediction is a method of carrying out the motion prediction by referring an identical frame (the single input frame 201 to be coded).

The codec 14 sequentially applies coding processing to each frame (input frame 201) composing a moving picture. That is, the codec 14: obtains information on the difference between the input frame 201 and an output frame of a motion compensation circuit 206 (after-mentioned prediction frame) or an output frame of an intra prediction circuit 208; and then inputs the information on the difference into a DCT (Discrete Cosine Transform) circuit 202.

Here, a switch 214 is used for switching the selection of an output frame. And a switch 214 is switched in accordance with the instruction of the CPU 11. The CPU 11 switches the switch 214, for example, in accordance with the type of a frame to be coded and the like. However, the switching operation required for such a switch 214 is likely to depend on the implementation in an encoder and hence is not uniquely decided also in the present embodiment. In intraframe prediction, the switch 214 is connected to the intra prediction circuit 208, and in interframe prediction, the switch 214 is connected to the motion compensation circuit 206.

Then the DCT circuit 202 applies frequency transformation to the input difference information. Next, a quantization circuit 203 quantizes the difference information subjected to the frequency transformation. Then a coding circuit 204 applies entropy coding to the quantized difference information and thereafter temporarily stores the quantized difference information in the motion memory 12.

Further, the output of the quantization circuit 203 is input into the coding circuit 204 and also input into an inverse-quantization circuit 211. The inverse-quantization circuit 211 and an inverse DCT circuit 210 at the next step thereof inverse-quantize and decode the difference information quantized in the quantization circuit 203. A reconfigured frame is produced by adding the outputs from the SW 214 and the inverse DCT circuit 210.

Then the reconfigured frame is subjected to processing for noise removal and the like with a filter 209. The reconfigured frame after subjected to filter processing is output from the filter 209 and retained in the motion memory 12 as a reference frame 212. Before inputted into the filter 209, the reconfigured frame is also input into the intra prediction circuit 208 and the mode selection circuit 207. Alternatively, the reconfigured frame which is input into the intra prediction circuit 208 and the mode selection circuit 207 may be filtered, even though it is not filtered in FIG. 2.

Then the reference frame 212 retained in the motion memory 12 is used for interframe prediction. That is, the codec 14 firstly detects a motion vector between the reference frame 212 and the input frame 201 with a motion detection circuit 205 on the occasion of carrying out interframe prediction. Then the motion compensation circuit 206 produces a prediction frame based on the motion vector detected by the motion detection circuit 205. Thereafter, as stated above, the difference information between the prediction frame and the input frame 201 is input into the DCT circuit 202 when the switch 214 selects the motion compensation circuit 206. In FIG. 2, the reconfigured frame is also inputted into the mode selection circuit 207 and the intra prediction circuit 208 even in interframe prediction. However, the codec 14 works properly because the switch 214 is connected only to the motion compensation circuit 206 in interframe prediction.

Alternatively, it may be possible to put a switch before the mode selection circuit 207 and the intra prediction circuit 208 and turn off the switch to prevent the reconfigured frame from inputting the mode selection circuit 207 and the intra prediction circuit 208 in interframe prediction.

Meanwhile, the reconfigured frame which is input into the intra prediction circuit 208 and the mode selection circuit 207 is used for intraframe prediction processing distinctive of the present embodiment in the intra prediction circuit 208. In FIG. 2, the reconfigured frame is also inputted into the motion memory 12 even in intraframe prediction. However, the codec 14 works properly because the switch 214 is connected only to the intra prediction circuit 208 in intraframe prediction.

Alternatively, it may be possible to put a switch after or before the filter 209 and turn off the switch to prevent the reconfigured frame from inputting the motion memory 12.

That is, in intraframe prediction, the mode selection circuit 207 decides what type of an intraframe prediction method is used for the motion prediction of the input frame 201 to be coded. The mode selection circuit 207 can select roughly either a method of applying prediction to each macro block of 16×16 pixels or a method of applying prediction to each block of 4×4 pixels in the same way as the case of the intraframe prediction in H.264/AVC. However, in the present embodiment, the motion prediction is applied to each block of 4×4 pixels (the details are explained later with reference to FIG. 3). Then the intra prediction circuit 208 produces a prediction frame by the method decided by the mode selection circuit 207.

By the circuit configuration of FIG. 2, even just after the codec 14 changes from intraframe prediction to interframe prediction, the reference frame 212 retained in the motion memory 12 can be used for interframe prediction.

Here, each component of the codec 14 having the aforementioned circuit configuration operates in accordance with, for example, a system clock (synchronous clock) 213 commonly used in the control circuit 1. Further, the CPU 11 instructs the codec 14 to commence coding processing in accordance with, for example, the temporary storage of the input frame 201 to be processed in the motion memory 12. Then the CPU 11: prepares the next input frame 201 in accordance with, for example, the receipt of the notice showing the completion of the coding of the input frame from the codec 14; and instructs the codec 14 to carry out coding processing.

(Method of Intraframe Prediction)

Here, though it overlaps with the general processing configuration of H.264/AVC, the basic processing configuration adopted in intraframe prediction according to the present embodiment is explained and thereafter the processing configuration distinctive of the present embodiment is explained.

Firstly, the relationship between the input frame 201 and a block of 4×4 pixels (4×4 block) composing the input frame and the method of intraframe prediction are explained.

Figure 4:
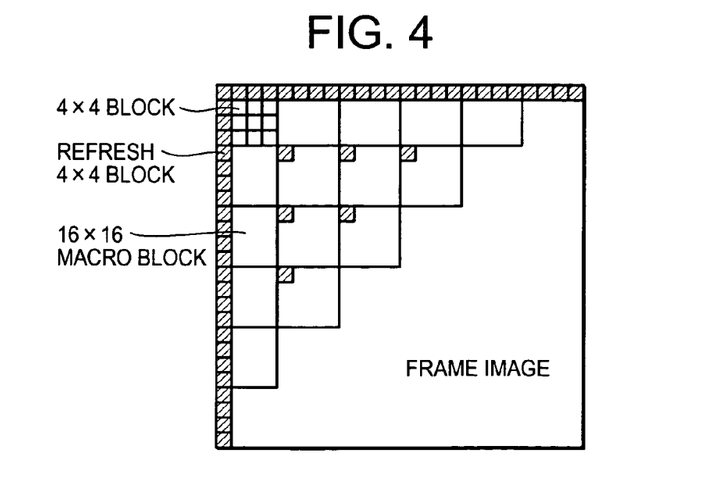
FIG. 4 is a chart explaining a frame image (input frame 201), macro blocks composing the frame image, and sub-macro blocks composing each of the macro blocks in intraframe prediction according to the present embodiment.

FIG. 4 is a chart explaining a frame image (input frame 201), macro blocks composing the frame image, and sub-macro blocks composing each of the macro blocks in intraframe prediction according to the present embodiment.

As shown in FIG. 4, in intraframe prediction according to the present embodiment, the motion prediction of the frame image to be coded (input frame 201) is carried out at each of the 4×4 blocks (including the refresh 4×4 blocks shown with oblique lines in the figure) that are the sub-macro blocks composing each of the 16×16 blocks (macro blocks). The 4×4 block may be selected by generally used zigzag scanning on the occasion of coding the input frame 201. Meanwhile, a refresh 4×4 block is explained later.

Figure 5:
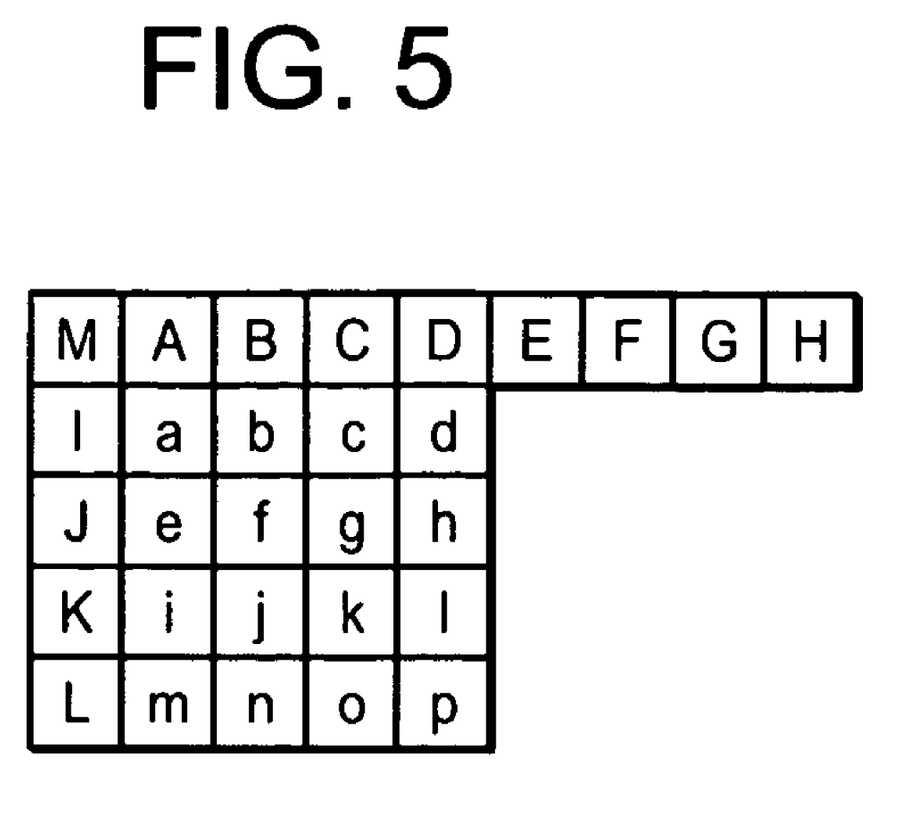
FIG. 5 is a representative chart explaining the relationship between a 4×4 block to be processed and the pixels of a processed reconfigured frame.

FIG. 5 is a representative chart explaining the relationship between a 4×4 block to be processed and the pixels of a processed reconfigured frame. Then FIG. 6 comprises charts explaining the nine modes that can be used when a 4×4 block to be processed is coded.

In the representative chart shown in FIG. 5, the small letters a to p represent 16 pixels composing a 4×4 block to be processed (hereunder referred to as "block X to be processed" occasionally). Further, the capital letters A to M represent pixels composing parts of a reconfigured frame already processed prior to the motion prediction of the block X to be processed. Then the positional relationship between a to p and A to M is the same also in the nine modes (mode 0 to mode 8) shown in FIG. 6. Note that, in the mode 2 shown in FIG. 6(c), the average of the values of the pixels A to D and the pixels I to L is used as the predictive value of the value of the pixels composing the prediction block.

The procedures through which the codec 14 processes the intraframe prediction in the present embodiment are basically the same as those of H.264/AVC.

That is, the codec 14 produces a prediction block of 4×4 pixels on the pixels a to p of the block X to be processed by using the pixels A to M of the reconfigured frame. Further, the codec 14 measures the difference between the produced prediction block and the actual input block (block X to be processed) and codes the difference.

More specifically, the codec 14 determines the predictive value of each pixel corresponding to each of the pixels a to p of the block X to be processed when the prediction block is produced. Also in the codec 14 according to the present embodiment, the nine types of modes (mode 0 to mode 8) shown in FIGS. 6(a) to 6(i) are prepared beforehand in order to refer to them when the prediction block is produced in the same way as the case of H.264/AVC. The codec 14, like H.264/AVC, can refer to any of the nine types of modes for determining the prediction block.

Then, in the nine types of modes, the starting points of the arrows shown in the areas of the pixels a to p composing the block X to be processed indicate the pixels, which are to be used as the criteria at the time of the decision of the predictive values, among the pixels A to M of the reconfigured frame. For example, in the case of the mode 1 shown in FIG. 6(b), the predictive value of the pixels a to d is determined by the pixel I, the predictive value of the pixels e to h by the pixel J, the predictive value of the pixels i to l by the pixel K, and the predictive value of the pixels m to p by the pixel L. In the other modes shown in FIG. 6, the relation between the pixels to be used as the criteria on the occasion of the decision of the predictive values and the arrows is the same.

Then, the codec 14 computes the difference between each of the predictive value's of 4×4 pixels composing the prediction block and the pixel values of the pixels a to p composing the block X to be processed.

Further, in the general processing configuration of H.264/AVC, the total value SAE (Sum of Absolute Error) of the differences computed through the above procedures is computed for each mode. For example, the SAE of the mode 1 shown in FIG. 6(b) can be calculated with the following equation;

$$SAE = (a+b+c+d-I\times 4) + (e+f+g+h-J\times 4) + (i+j+k+l-K\times 4) + (m+n+o+p-L\times 4).$$

Then, in the general processing configuration of H.264/AVC, in order to improve coding efficiency, a mode having the minimum SAE among the computed SAEs of the nine types of the modes is selected. Then, by coding the difference thus computed, the coding length (namely the size of the compressed image data) is shortened.

However, the processing configuration of computing the nine types of modes for all the blocks X to be processed makes it possible to surely improve the coding efficiency but it increases the amount of calculation. Therefore, in an electronic device wherein the above processing configuration of the intraframe prediction is implemented, it is desirable to reduce the amount of calculation from the viewpoint of the reduction of the volume and the cost of hardware and the reduction of electric power consumption.

Figure 6:
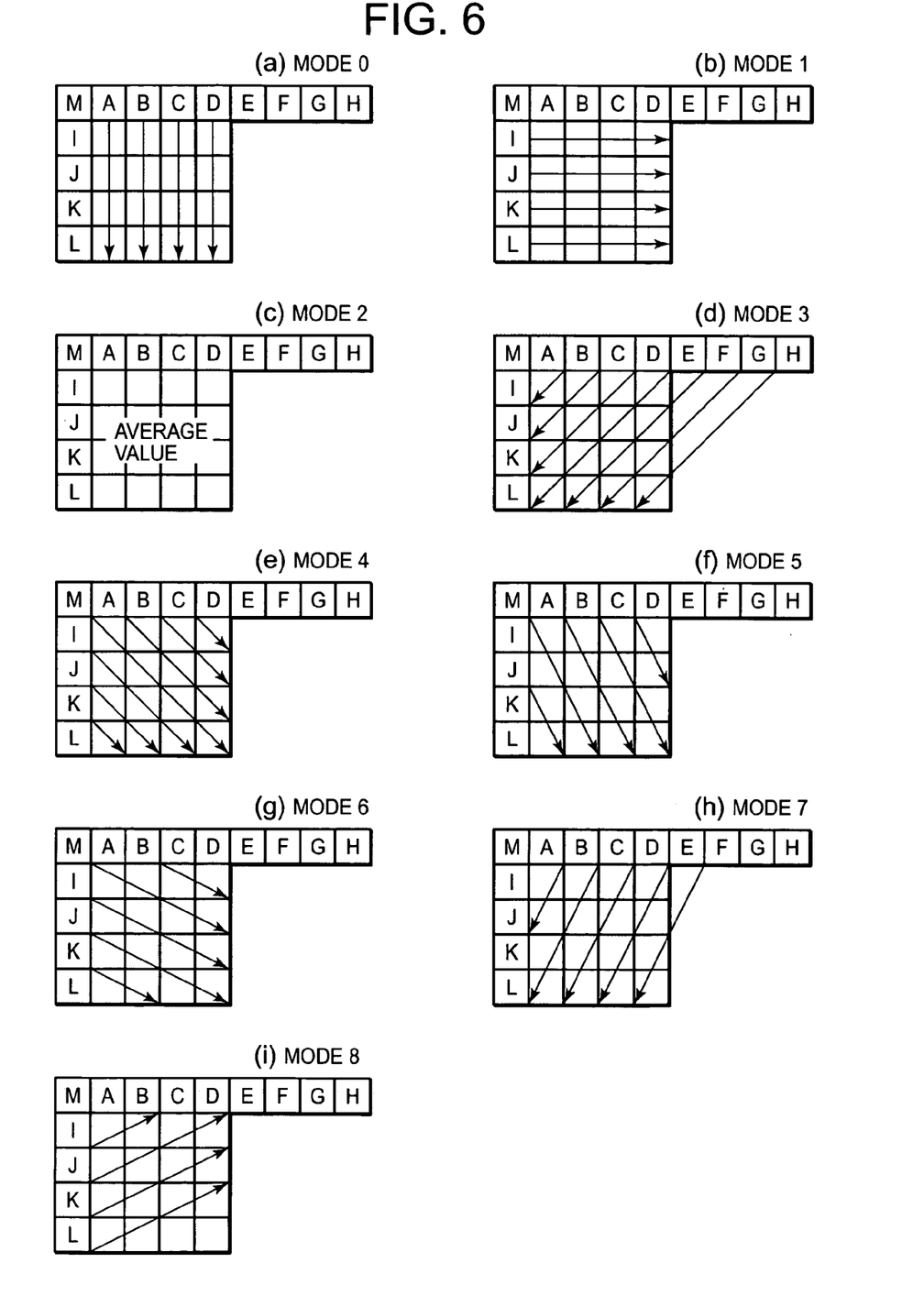

Consequently, in the present embodiment, the amount of calculation is reduced by adopting the after-mentioned processing configuration and intra prediction circuit 208 (refer to FIG. 3) in the codec 14 in the control circuit 1 based on the aforementioned processing configuration referring to FIGS. 5 and 6. In this case, the present embodiment takes the general advantage that high correlation exists among adjacent pixels or among block images as the nature of an image.

Figure 7:
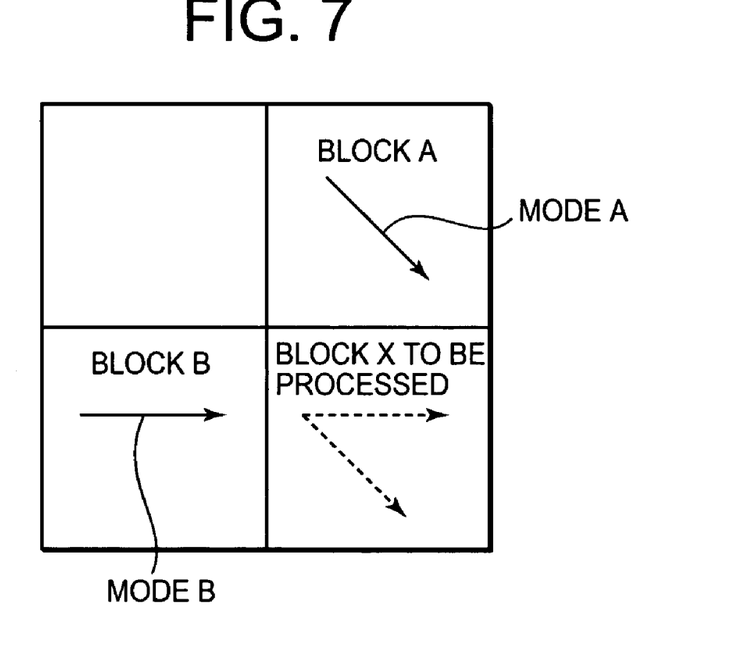
FIG. 7 is a chart explaining the feature of motion prediction in an intra prediction circuit 208 according to the present embodiment.

FIG. 7 is a chart explaining the feature of motion prediction in an intra prediction circuit 208 according to the present embodiment.

In the figure, the block X to be processed is a block which: composes a part of an input frame to be coded; and has 4×4 pixels corresponding to the aforementioned pixels a to p. Meanwhile, the blocks A and B are blocks which: are parts of the reconfigured frame which are used for the input frame; and include parts of the aforementioned pixels A to M. Further, the arrows shown in the blocks schematically represent "mode vectors" which are to be explained later. Here, in the following explanations, the mode decided for the prediction of the block B is referred to as "mode B" and the mode decided for the prediction of the block A is referred to as "mode A."

The general advantage that high correlation exists among adjacent pixels or among pixel blocks also applies to the relation among the blocks A and B and the block X to be processed shown in FIG. 7. Thus, in the present embodiment, the modes of the already processed blocks A and B are stored beforehand and the mode of the block X to be processed is decided by utilizing the stored modes of the blocks A and B in the intraframe prediction of the 4×4 block. More specifically, in the present embodiment, on the occasion of the decision of the mode of the block X to be processed, all the aforementioned nine types of modes are not used as the target candidates for the computation of the SAEs, but the number of the candidates is reduced to a necessary minimum number based on the already decided modes of the blocks A and B. Thereby, in the present embodiment, it is possible to decide the mode of the block X to be processed with a small amount of calculation in comparison with the case of computing the SAEs of all the nine types' of modes in the aforementioned general processing configuration.

Note that there are cases where the blocks A and B to be referred to do not exist. Whether these cases occur or not depends on the locations of the block X in a frame image. In such a case, even in the present embodiment, the SAEs of all the nine types of modes are computed.

Next, the configuration of the intra prediction circuit 208 that realizes the aspect distinctive of the present embodiment is explained.

(Intra Prediction Circuit 208)

Figure 3:
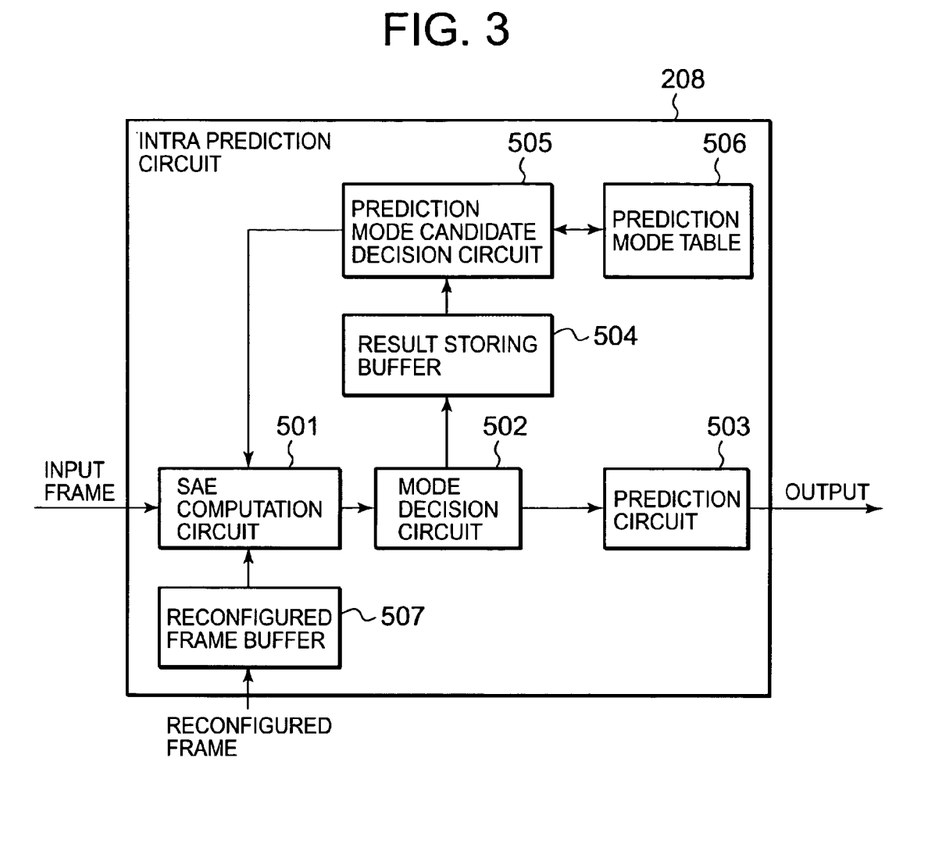
FIG. 3 is a block diagram showing the circuit configuration of an intra prediction circuit 208 contained in the codec 14 shown in FIG. 2.

FIG. 3 is a block diagram showing the circuit configuration of an intra prediction circuit 208 included in the codec 14 shown in FIG. 2. Firstly, the functions of each part of the intra prediction circuit 208 are explained along the flow of operation.

A reconfigured frame formed through inverse-quantization and inverse-DCT in the codec 14 is stored in a reconfigured frame buffer 507 in the intra prediction circuit 208. Then, the processed blocks A and B are extracted from the reconfigured frame stored in the reconfigured frame buffer 507 in accordance with the location of the block X to be processed. Here, the blocks A and B extracted from the reconfigured frame retain the pixel values of the reconfigured frame at the pixels corresponding to the pixels A to M shown in FIG. 5. Then, the extracted blocks A and B are input into an SAE computation circuit 501.

Meanwhile, the block X to be processed of 4×4 pixels (pixels a to p) in the input frame 201 is input into the SAE computation circuit 501 in the intra prediction circuit 208 via the mode selection circuit 207. Further, the mode information representing the candidates the number of which is reduced in a prediction mode candidate decision circuit 505 is input into the SAE computation circuit 501. The prediction mode candidate decision circuit 505 decides the target candidates for the SAE computation of the block X to be processed in advance of the computation processing of the block X to be processed in the SAE computation circuit 501. The target candidates are decided based on the modes of the already processed blocks A and B (modes A and B) and the rules described in a prediction mode table 506. Here, the prediction mode table 506 is stored beforehand in a non-volatile storage medium in the codec 14 (it may be stored in the retention memory 13). The details of the prediction mode table 506 are explained later with reference to FIGS. 8 and 9.

Then, in the SAE computation circuit 501, the SAEs on the block X to be processed is computed based on the information input as stated above. That is, the SAE computation circuit 501 computes the SAE of each of the modes of the target candidates represented by the mode information (namely the modes the number of which is reduced to the minimum) with regard to the block X to be processed. The SAEs are computed by using the pixel values of the pixels A to M of the blocks A and B. The SAEs of the modes computed in the SAE computation circuit 501 are input into a mode decision circuit 502.

Next, the mode decision circuit 502 detects the minimum SAE from among the input SAEs of the modes. Then the mode decision circuit 502 decides the mode corresponding to the detected minimum SAE as the mode of the block X to be processed. Further, the mode decision circuit 502 outputs the information representing the decided mode to a prediction circuit 503 and a result storing buffer 504.

The result storing buffer 504 retains the information representing the mode output from the mode decision circuit 502. That is, the information representing the mode retained in the result storing buffer 504 includes not only the information on the block X to be processed but also the information on the blocks heretofore processed.

More specifically, the result storing buffer 504 already retains the mode A previously decided for the adjacent block A and the mode B previously decided for the adjacent block B before storing the information representing the mode decided for the block X to be processed. Further, the two 4×4 blocks corresponding to the blocks A and B in the reconfigured frame stored in the reconfigured frame buffer 507 are assigned by the SAE computation circuit 501. Then the prediction mode candidate decision circuit 505 reads out the mode A of the block A and the mode B of the block B, both the blocks being adjacent to the block X to be processed, from the result storing buffer 504 in advance of the computation processing of the block X to be processed in the SAE computation circuit 501.

Next, the prediction mode candidate decision circuit 505 decides the modes of the minimum required number of target candidates most appropriate to the block X to be processed based on the mode A of the block A and the mode B of the block B by referring to the rules described in the prediction mode table 506. Here, the procedures for deciding target candidates in the prediction mode candidate decision circuit 505 are explained later with reference to FIGS. 8 and 9.

Then the mode information representing the target candidates for the SAE computation, the target candidates being decided in the prediction mode candidate decision circuit 505, is input into the SAE computation circuit 501. Thus the SAE computation circuit 501 computes an SAE of each of the modes (mode information) of the target candidates input from the prediction mode candidate decision circuit 505 and sets the computation result to the mode decision circuit 502 for the block X to be processed.

Meanwhile, the prediction circuit 503 produces a difference block for the block X to be processed by using the information representing the mode decided through the aforementioned procedures in the mode decision circuit 502. Then the produced difference block is output from the intra prediction circuit 208.

(Method for Deciding Target Candidates in Prediction Mode Candidate Decision Circuit 505)

Next, the procedures for deciding modes to be target candidates for the SAE computation of the block X to be processed in the prediction mode candidate decision circuit 505 are explained.

Figure 8:
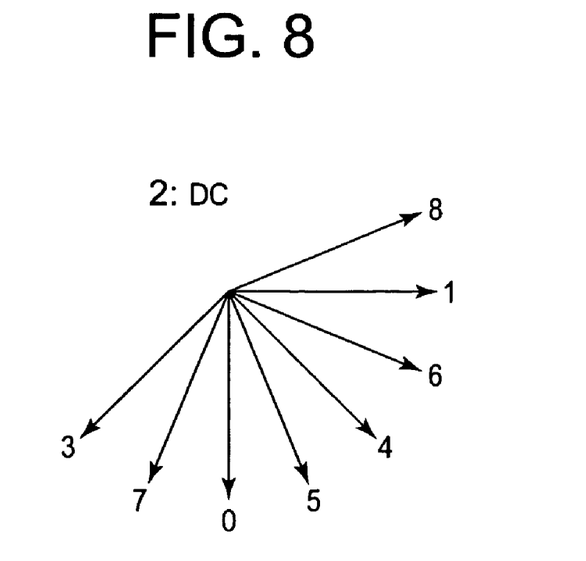
FIG. 8 is a chart showing mode vectors corresponding to the nine types of modes (modes 0 to 8)

The arrows shown in the nine types of modes of FIG. 6 indicate the direction of the change of adjacent pixel values. Then, when the nine types of modes are correctively expressed as the vectors having an identical starting point, the vectors are expressed as shown in FIG. 8. The vectors are hereunder referred to as "mode vectors" in the explanations below.

FIG. 8 is a chart showing mode vectors corresponding to the nine types of modes (modes 0 to 8). The numerals described in the vicinity of the end points of the mode vectors shown in the figure represent the mode values corresponding to the modes 0 to 8, respectively (excluding the case of the mode 2 that uses the DC component (direct current component, or average value)) The angle formed by adjacent two vectors (unit angle) is 22.5 degrees. In the explanations below, two mode vectors forming the angle difference of 22.5 degrees as the unit angle are referred to as "adjacent modes."

In the explanations below, configuration rules which are stored in a prediction mode table (FIG. 9) are explained by using the mode vectors shown in FIG. 8.

As stated above, in the present embodiment, the general advantage of an image is used for reducing the amount of calculation. That is, the present embodiment is based on the knowledge that, when the directions of the mode vector of the block A (mode A) and the mode vector of the block B (mode B), those blocks having been decided to be used as the target candidates for the SAE computation, are close to each other, the probability that the direction of the mode vector of the block X to be processed is also identical with or similar to the above directions is high. Then, in the present embodiment, the rules explained below are embodied in the prediction mode table 506 based on that knowledge.

However, when the target candidates for the SAE computation are decided in the prediction mode candidate decision circuit 505, as a general rule (as a prerequisite), the three modes of the mode A of the block A, the mode B of the block B, and the mode 2 are inevitably determined as target candidates (prediction modes). Here, the reason why the mode 2 is determined as a target candidate is that the mode 2 corresponds to the DC, component and hence a reasonable result can be obtained rather by computing SAE values for all the blocks X to be processed in order to obtain an average SAE value.

Then the modes other than the above three modes are described in the prediction mode table 506 in accordance with the correlation of images as explained in the following rules (1) to (7).

(1) The Case where the Mode A and the Mode B are Equal to Each Other but Not Equal to Mode 2

In this case, the correlation between the block A and the block B is the highest in comparison with the other cases and hence it is estimated that the correlation between both the blocks and the block X to be processed is also high. Therefore, in this case, it is unnecessary to select a new mode other than the three types of modes as the prerequisite.

That is, in the case where the mode A and the mode B are equal to each other but not equal to mode 2, it is only necessary to select the two types of prediction modes, in total, comprising the mode A (=B) and the mode 2.

(2) The Case where the Mode A and the Mode B are Adjacent Modes

In this case, the correlation between the block A and the block B is considerably high and hence it is estimated that the correlation between both the blocks and the block X to be processed is also high. Therefore, in this case too, it is unnecessary to select a new mode other than the three types of modes as the prerequisite in the same way as the above rule (1).

That is, in the case where the mode A and the mode B are adjacent modes, it is only necessary to select the three types of modes, in total, comprising the mode A, the mode B, and the mode 2 as the prerequisite.

(3) The Case where Both the Mode A and the Mode B are Equal to the Mode 2

In this case, the correlation between the block A and the block B is low and hence it is estimated that the correlation between both the blocks and the block X to be processed is also low. Therefore, in this case, it is difficult to predict the mode of the block X to be processed based on the modes A and B. However, if the block A and the block B are the mode 2, it is still possible that the block X to be processed adjacent to those blocks is also the mode 2. Consequently, in this case, in addition to the above three types of modes as the prerequisite, the mode 0 in the vertical direction and the mode 1 in the horizontal direction are selected in consideration of the shape of each pixel composing a frame image.

That is, in the case where both the mode A and the mode B are equal to the mode 2, it is only necessary to select the three types of modes, in total, comprising the mode 0, the mode 1, and the mode 2 based on the aforementioned prerequisite. In this case however, it is preferable to select also other modes in order to preferentially implement more accurate mode prediction.

(4) The Case where Either the Mode A or the Mode B is Equal to the Mode 2

This case shows that, in either the block A or the block B which is already decided to be the mode 2, the DC component of the 4×4 pixels composing the decided block is dominant. Then the case has the possibility that correlation exists between the other block which is different from the mode 2 and the block X to be processed. Therefore, in this case, a mode adjacent to the mode of the other block which is different from the block of the mode 2 is selected in addition to the above three types of modes as the prerequisite.

That is, in the case where either the mode A or the mode B is equal to the mode 2, it is only necessary to select the three or four types of modes, in total, comprising: the mode of the other block which is different from the block (A or B) which is the mode 2; a mode or modes adjacent to the target mode (one type or two types depending on the block location); and the mode 2 based on the prerequisite.

(5) The Case where the Angle Between the Mode Vector of the Mode A and that of the Mode B is Less Than 90 Degrees In this case, correlation exists more than a little between the block A and the block B and hence it is estimated that similar correlation also exists between both these blocks A, B and the block X to be processed. Therefore, in this case, the modes corresponding to all the mode vectors interposed between the mode vector of the block A (mode A) and that of the block B (mode B) are selected in addition to the above three types of modes as the prerequisite.

That is, in the case where the angle between the mode vector of the mode A and that of the mode B is less than 90 degrees, it is only necessary to select the three to five types of modes, in total, comprising: mode or modes corresponding to all the mode vectors interposed between the mode A and the mode B (0 to maximum 2 types); and the three types of modes based on the prerequisite.

(6) The Case where the Angle Between the Mode Vector of the Mode A and that of the Mode B is 90 Degrees In this case, basically similarly to the case of the above rule (5), correlation exists more than a little between the block A and the block B. Therefore, it is estimated that similar correlation exists between both these blocks A, B and the block X to be processed. However, in this case, the number of all the mode vectors interposed between the mode A and the mode B is larger than the case of the above rule (5). Hence, it is feared that the amount of calculation is not reduced when the mode selection is carried out by similar criteria. Consequently in this case, in consideration of computation efficiency, all the mode vectors interposed between the mode vector of the mode A and that of the mode B are not selected as candidates but the mode vectors forming the angles of 45 degrees with both the mode vectors respectively are selected as the representatives.

That is, in the case where the angle between the mode vector of the mode A and that of the mode B is 90 degrees, it is only necessary to select the four types of modes, in total, comprising: a mode corresponding to the mode vector that is interposed between the mode vector of the mode A and that of the mode B and forms the angle of 45 degrees with both the mode vectors; and the three types of modes based on the prerequisite.

(7) The Case where the Angle Between the Mode Vector of the Mode A and that of the Mode B Exceeds 90 Degrees In this case, it is estimated that correlation between the block A and the block B is low. Hence, in this case, it is difficult to predict the block X to be processed based on the modes A and B. However, the case still has the possibility that correlation exists between the block A or the block B and the block X to be processed. In this case however, it is inefficient to select the modes corresponding to all the mode vectors interposed between the mode A and the mode B and compute the SAEs of the selected modes. Consequently, in the case where the angle between the mode vector of the mode A and that of the mode B exceeds 90 degrees, in addition to the three types of modes based on the prerequisite, two mode vectors are selected as the representatives from among the mode vectors interposed between the mode vector of the mode A and that of the mode B. As the two mode vectors to be the representatives, for example, two mode vectors that equally divide the angle formed between the mode vector of the block A (mode A) and that of the block B (mode B) are selected.

That is, in the case where the angle between the mode vector of the mode A and that of the mode B exceeds 90 degrees, it is only necessary to select the five types of modes, in total, comprising: two types of modes corresponding to two mode vectors to be the representatives interposed between the mode vector of the mode A and that of the mode B; and the three types of modes based on the prerequisite.

Figure 9:
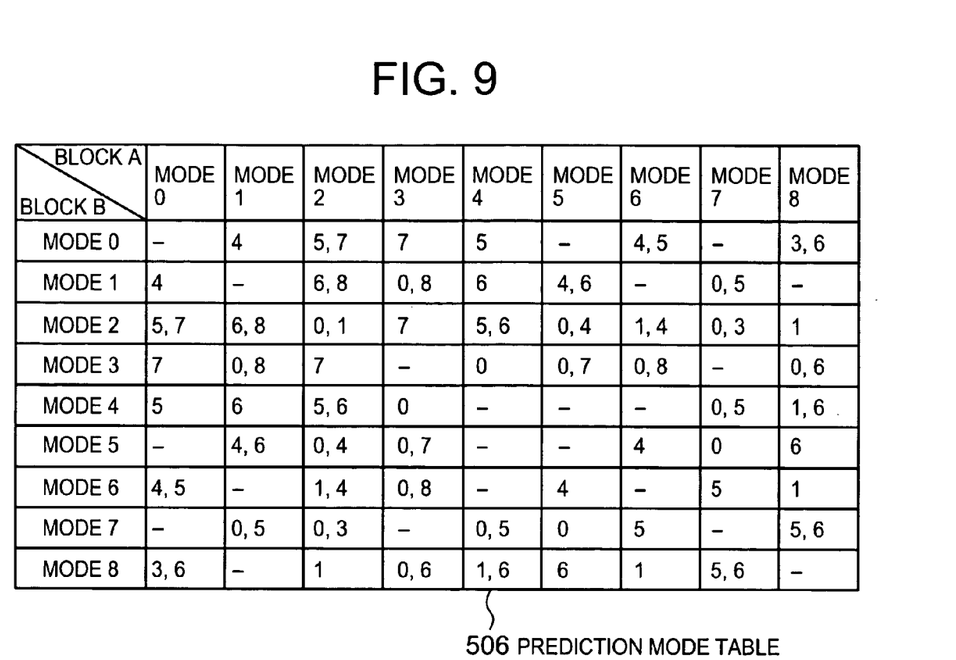
FIG. 9 shows a prediction mode table which is referred to when target candidates for the SAE computation of a block X to be processed are selected in the present embodiment.

FIG. 9 shows a prediction mode table which is referred to when target candidates for the SAE computation of a block X to be processed are selected in the present embodiment. The prediction mode table 506 shown in the figure represents an example of concretely applying the nine types of mode vectors to the block X to be processed based on the aforementioned rules (1) to (7).

In the prediction mode table 506 shown in FIG. 9, the decided modes of the block B are shown in the direction of the column and the decided modes of the block A are shown in the direction of the row. Then the numerals in the boxes specified by the modes on the blocks A and B represent the modes (prediction mode) to be used as the target candidates for the SAE computation of the block X to be processed. Further, in the prediction mode table 506 shown in FIG. 9, the mark "-" in some boxes means that there is no mode to be selected in a relevant box on the occasion of the selection of target candidates. Then, as it is obvious from the prediction mode table 506 (in FIG. 9) and the prerequisite meaning that the prescribed three types of modes are selected as a general rule, the number of the types of modes to be selected as the target candidates for the SAE computation is five at the maximum and two at the minimum.

Consequently, by the present embodiment, though it also depends on the content of an image (namely the state of the distribution of pixel values) and the location of the block X to be processed in the input frame 201, it is possible to reduce the amount of calculation to a half or less in comparison with the case of computing all the nine types of modes for a certain block X to be processed.

That is, in the present embodiment, differences are computed only for minimum required prediction modes decided from among the nine types of modes based on the already decided coding modes (the modes A and B) of the processed blocks A and B. Here, the minimum required prediction modes are the three types of modes as the prerequisite and the prediction mode(s) read out from the prediction mode table 506. Consequently, it is possible to remarkably reduce the amount of calculation on the occasion of deciding the coding mode of the block X to be processed in comparison with conventional procedures wherein the differences on all the nine types of prediction modes have individually been computed.

Meanwhile, when mode prediction (mode selection) is used continuously through the aforementioned procedures, there arises the possibility that the accumulated errors increase in comparison with the case where an optimum mode is decided based on the result obtained by computing the SAEs of all the nine types of modes. In consideration of the possibility, in the present embodiment, 4×4 blocks for refresh (refresh 4×4 blocks) are defined for each 16×16 macro block as shown in FIG. 4. Then, when the block X to be processed corresponds to a refresh 4×4 block in a frame image, the intra prediction circuit 208 computes the SAEs of all the nine types of modes for the block X to be processed and selects a mode of the minimum SAE based on the computation result.

Further, in the present embodiment, the intra prediction circuit 208 uses each of the 4×4 blocks located at the left end and upper end of the frame image as a refresh 4×4 block. The reason is that, in relation to the direction of zigzag scanning, when the block X to be processed is identical to a 4×4 block located at the left end and upper end of the frame image, the block A or B to be referred to on the occasion of mode prediction does not exist.

First Modification

Figure 10:
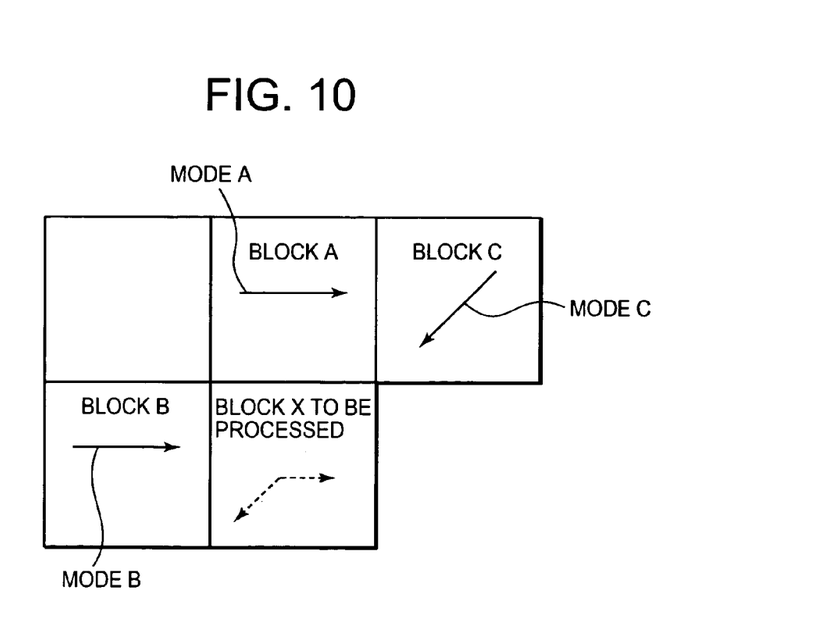
FIG. 10 is a chart explaining the feature of motion prediction in an intra prediction circuit 208 according to a first modification of the present embodiment.

FIG. 10 is a chart explaining the feature of motion prediction in an intra prediction circuit 208 according to a first modification of the present embodiment.

In the present modification, when the modes for the computation of the SAEs of a block X to be processed are decided, the three blocks A to C adjacent to the block X to be processed are used as shown in FIG. 10. Then, with regard to the rules on the occasion of selecting the target candidates for the computation of the SAEs of the block X to be processed based on the already decided modes A to C of the blocks A to C, it is only necessary to follow the aforementioned rules (1) to (7) in the present modification too. However, in the case of the present modification, the three types of variables A to C exist and hence it is impossible to reflect the mode C of the block C to the mode prediction of the block X to be processed with the prediction mode table shown in FIG. 9. To cope with that, in the present modification, a three dimensional table representing the three blocks A to C is prepared, for example. Otherwise, in the present modification, it is also acceptable, for example, to have a prediction mode table for referring to the blocks C and A and use the table together with the prediction mode table for referring to the blocks A and B in an appropriate manner.

Second Modification

In the aforementioned embodiment, in the control circuit 1 in the mobile phone 100, the intra prediction circuit 208 in the codec 14 is composed of hardware. In contrast to such an equipment configuration, in the case of the present modification, the aforementioned functions of the codec 14 are performed by software. Note that the functions of the codec 14 except the functions of the intra prediction circuit 208 are nearly identical to those of the generally used circuit configuration of H.264/AVC. Hence, when the processing procedures performed in such a circuit configuration are exercised by software run with the CPU 11 in the control circuit 1, a generally used processing configuration can be adopted. Consequently, in the present modification, explanations are given based on the case of realizing the functions of the intra prediction circuit 208 distinctive of the present modification with software, and the explanations on the software corresponding to all the functions of the codec 14 are omitted here.

Figure 11:
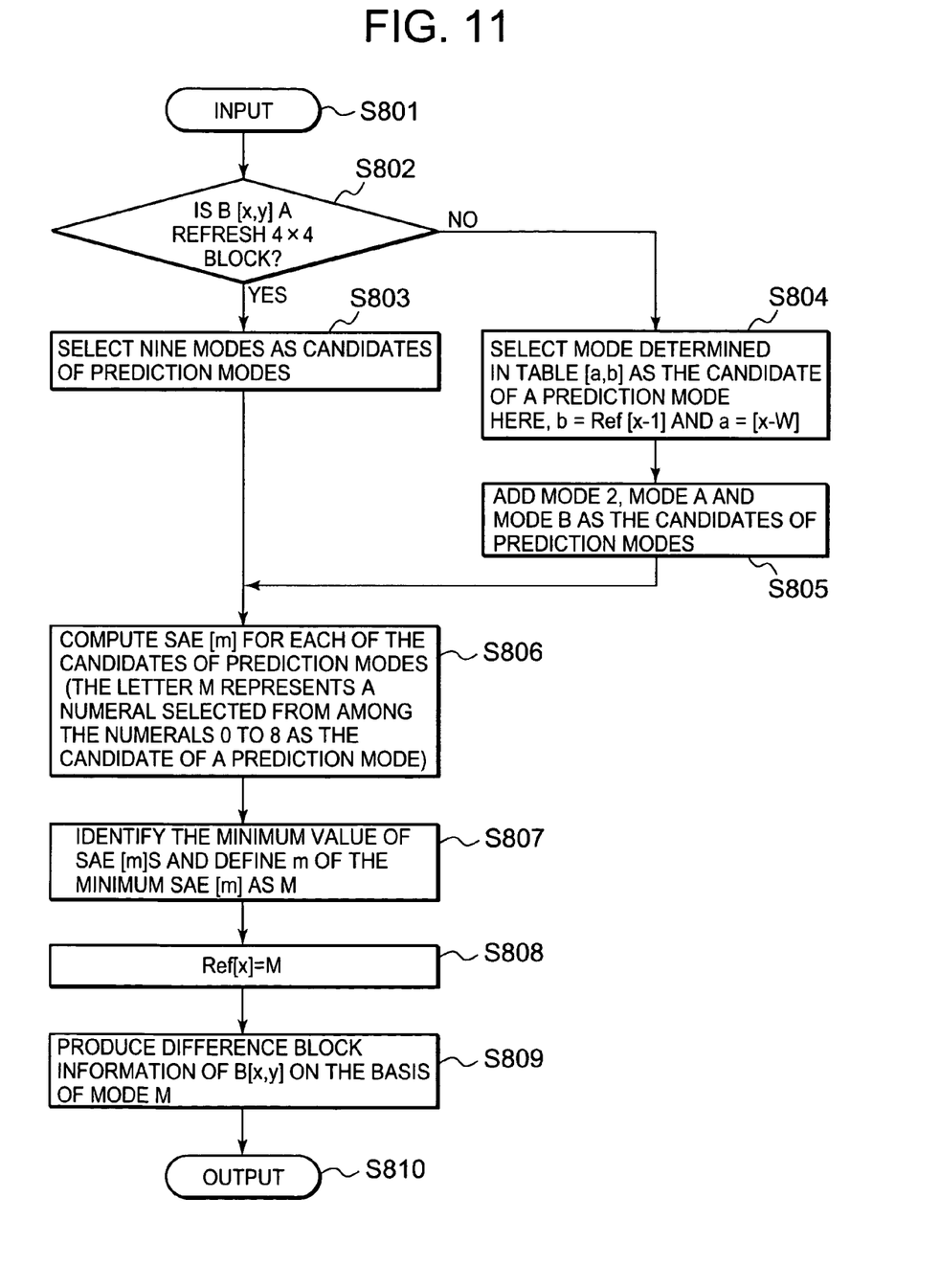
FIG. 11 is a flow chart of an intra prediction functional module implemented in a codec 14 in a second modification of the present embodiment.

FIG. 11 is a flow chart of an intra prediction functional module implemented in a codec 14 in a second modification of the present embodiment. The flow chart shows the processing procedures of the software program run by the CPU 11 in the control circuit 1 in the mobile phone 100 shown in FIG. 1. By the processing flow of FIG. 11, the input frame, which has H pixels in the vertical direction and W pixels in the horizontal direction, is processed.

In FIG. 11, B[x,y] represents the block X to be processed having 4×4 pixels. Here, the letters x and y are indexes of the block X to be processed and they satisfy the expressions $0 \leq x \leq (W/4)-1$ and $0 \leq y \leq (H/4)-1$, respectively. For example, in the case of H=64 and W=64, 256 pieces of 4×4 blocks exist in the frame image and x and y take the values of 0 to 15, respectively. Then, in the present modification, the indexes x and y of the block X to be processed are also input into the intra prediction functional module (refer to FIG. 10) in accordance with the pixel values of the 4×4 pixels of the block X to be processed being input.

Further, a variable Table [a,b] represents the prediction mode table (506) shown in FIG. 9. In the present modification, the prediction mode table (506) may be stored in, for example, the retention memory 13. A variable Ref[i] ($0 \leq i \leq W-1$) represents the value of a past prediction mode already decided in advance of the block X to be processed. That is, in the present modification too, the target modes for the SAE computation of the block X to be processed are decided based on the block A (mode A) and the block B (mode B). To this end, in the present modification, the values of the already decided modes of the blocks A and B are retained with the variable Ref[i] instead of the result storing buffer 504 in the intra prediction circuit 208 shown in FIG. 3.

In the intra prediction functional module (FIG. 11) described with such variables, with regard to the block X to be processed (B[x,y]), the CPU 11 in the control circuit 1 firstly inputs the pixel values of 4×4 pixels and the indexes x and y representing the block X into, for example, the motion memory 12 (step S801). Here, the reconfigured frame buffer 507 to store a reconfigured frame may be prepared in, for example, the motion memory 12. Then at the step S801, the CPU 11 extracts the processed blocks A and B in accordance with the location of the block X to be processed.

Next, the CPU 11 judges whether or not the location of the block X to be processed. (B[x,y]) input at the step S801 corresponds to a refresh 4×4 block in the input frame 201 (step S802).

Then, when the judgment says "yes" at the step S802 (the case of a refresh 4×4 block), the CPU 11 selects all the nine types of modes as the candidates of the modes for the SAE computation of the block X to be processed (step S803).

On the other hand, when the judgment says "no" at the step S802 (the case of not a refresh 4×4 block), the CPU 11 selects the modes set in the Table[a,b] (prediction mode table) as the candidates (step S804). Here in this case, b=Ref[x−1] and a=Ref[x−W]. Further, the CPU 11 adds the mode 2, the mode A and the mode B as the three types of modes based on the aforementioned prerequisite to the candidates (step S805).

The CPU 11 computes SAE[m] for each of the nine types of modes selected at the step S803 or the modes selected at the steps S804 and S805 (step S806). Here, the letter m ($0 \leq m \leq 8$) represents each selected mode.

The CPU 11 identifies the minimum value from among SAE[m]'s computed at the step S806 and defines m of SAE [m] corresponding to the minimum value as M (step S807).

The CPU 11 sets M defined at the step S807 to Ref[x] (step S808). Then the CPU 11 produces difference block information of B[x,y] based on the mode M (step S809) and outputs the produced difference block information outside the intra prediction functional module (step S810).

Then, the CPU 11 carries out a series of the above processing (steps S801 to S810) for each of the blocks X to be processed in the input frame 201.

Even in the case of the present modification, the reduction of the amount of calculation is influenced by the content of an image (namely the state of the distribution of pixel values) and the location of the block X to be processed in the input frame 201. However, similarly to the aforementioned embodiment, it is possible to reduce the amount of calculation to a half or less in comparison with the case of computing all the nine types of modes for a certain block X to be processed.

Meanwhile, the present modification can be attained by: mounting a computer program-capable of realizing the functions of the flow chart (FIG. 11) referred to in the explanations onto the mobile phone 100; and thereafter reading out and running the computer program in the CPU 11 of the device. Further, the computer program supplied to the device may be stored in a memory device such as a random access memory.

Further in the above case, as a method of supplying the computer program to the device, a now generally employed method can be adopted, such as the method of installing the computer program to the device with an appropriate tool at the stage of production before shipping, maintenance after shipping or the like or the method of downloading the computer program from outside through a communication line such as the internet. Then in such a case, the present invention is configured with the codes of the computer program or a storage medium.

Meanwhile, in the aforementioned present embodiments and modifications, the explanations are given based on the case where the processing configuration of image coding according to the present invention is applied to a mobile phone as an example. However, the application range of the present invention is not limited to a mobile terminal such as a mobile phone. For example, the present invention is preferably applicable to: information processors such as a personal computer, a PDA (Personal Digital Assistant) and the like; and various kinds of electronic devices requiring the function of coding a digital image (image processors) such as a digital camera, a video camera, a stationary video recorder and the like.

What is claimed is:

1. An image coding method comprising:
   selecting, by a selecting circuit, prediction modes from among prescribed plurality of prediction modes based on processed blocks, the number of selected prediction modes being less than the number of said prescribed plurality of prediction modes;
   predicting, by a predicting circuit, a pixel of a block in an input frame image based on selected prediction modes;
   calculating, by a calculating circuit, a difference between said predicted pixel value and a pixel value of a block in an input frame; and
   determining, by a determining circuit, a coding mode based on the result of said calculation process performed by said calculating circuit, said determined coding mode being used for said image coding method.

2. An image coding method according to claim 1, wherein said determining process performed by said determining circuit determines the coding mode which has the minimum difference among all of the results calculated based on said selected prediction modes.

3. An image coding method according to claim 1, wherein said selecting process includes selecting:
   the coding modes of said processed blocks;

the coding mode based on the DC component of the values of a part of pixels of said processed blocks; and the coding mode read out from a table in which relationships between coding modes used in said processed blocks and a corresponding minimum number of coding modes are prescribed;

as said selected prediction modes.

4. An image coding method according to claim 3, wherein said processed blocks comprise a first block located in the vertical direction of said block to be processed and a second block located in the horizontal direction thereof.

5. An image coding method according to claim 1, wherein said processed blocks are at least two bocks which are adjacent to said block to be processed.

6. An image coding method according to claim 1, wherein said prediction modes are determined based on the correlation between said processed blocks and said block to be processed.

7. An image coding method according to claim 1, wherein said processed blocks comprise a first block located in the vertical direction of said block to be processed and a second block located in the horizontal direction thereof.

8. An image coding method according to claim 7, wherein when the determined coding mode on said first block and the determined coding mode on said second block are equal to each other but different from said coding mode based on the DC component, no corresponding prediction mode is prescribed in said table.

9. An image coding method according to claim 7, wherein when the vector of the determined coding mode on said first block and the vector of the determined coding mode on said second block are adjacent to each other and form a prescribed unit angle, no corresponding prediction mode is prescribed in said table.

10. An image coding method according to claim 7, wherein when the determined coding mode on said first block and the determined coding mode on said second block are equal to said coding mode based on said DC component, a mode of the vertical direction and a mode of the horizontal direction are prescribed in said table.

11. An image coding method according to claim 7, wherein when either the determined coding mode on said first block or the determined coding mode on said second block is equal to said coding mode based on the DC component, a prediction mode corresponding to a vector which is adjacent to and forms a prescribed unit angle with the vector of the determined coding mode on the block and which is different from the coding mode based on the DC component is prescribed in said table.

12. An image coding method according to claim 7, wherein when the vector of the determined coding mode on said first block and the vector of the determined coding mode on said second block form an angle of less than 90 degrees, the prediction modes corresponding to all the vectors interposed between those two vectors are prescribed in said table.

13. An image coding method according to claim 7, wherein when the vector of the determined coding mode on said first block and the vector of the determined coding mode on said second block form an angle of 90 degrees, the prediction modes corresponding to the vectors forming angles of 45 degrees with those two vectors respectively are prescribed in said table.

14. An image coding method according to claim 7, wherein when the vector of the determined coding mode on said first block and the vector of the determined coding mode on said second block form an angle of over 90 degrees, the two prediction modes corresponding to the two vectors which equally divide the angle formed by those two vectors are prescribed in said table.

15. An image coding method according to claim 1, wherein said image coding method is an intraframe prediction coding method conforming to the H.264/AVC (Advanced Video Codec) standard.

16. An image coding method according to claim 1, further comprising:

displaying, on a display device, an image in accordance with said image coding method.

17. An image encoder comprising:

a selecting circuit which selects prediction modes from among prescribed plurality of prediction modes based on processed blocks, the number of selected prediction modes being less than the number of said prescribed plurality of prediction modes;

a predicting circuit which predicts a pixel of a block in an input frame image based on selected prediction modes;

a calculating circuit which calculates a difference between said predicted pixel value and a pixel value of a block in an input frame; and a determining circuit which determines a coding mode based on the result of said calculation by said calculating circuit, said determined coding mode being used for coding said image.

18. An image encoder according to claim 17, wherein said determining circuit determines the coding mode which has the minimum difference among all of the results calculated based on said selected prediction modes.

19. An image encoder according to claim 17, wherein said selecting circuit selects:

the coding modes of said processed blocks;

the coding mode based on the DC component of the values of a part of pixels of said processed blocks; and the coding mode read out from a table in which relationships between coding modes used in said processed blocks and a corresponding minimum number of coding modes are prescribed;

as said selected prediction modes.

20. An image encoder according to claim 19, wherein said processed blocks comprise a first block located in the vertical direction of said block to be processed and a second block located in the horizontal direction thereof.

21. An image encoder according to claim 17, wherein said processed blocks are at least two bocks which are adjacent to said block to be processed.

22. An image encoder according to claim 17, wherein said prediction modes are determined based on the correlation between said processed blocks and said block to be processed.

23. An image encoder according to claim 17, wherein said processed blocks comprise a first block located in the vertical direction of said block to be processed and a second block located in the horizontal direction thereof.

24. An image encoder according to claim 17, further provided with an interframe prediction circuit for coding said input frame image based on the motion vector between a reference frame and said input frame image.

25. An image encoder according to claim 17, wherein said image encoder is an image encoder conforming to the H.264/AVC (Advanced Video Codec) standard.

26. A mobile terminal comprising an image encoder according to claim 17.

27. A non-transitory computer-readable recording medium having embodied thereon a computer program, which when executed by a computer, causes the computer to function as an image encoder, said image encoder comprising:
- a selecting circuit which selects prediction modes from among prescribed plurality of prediction modes based on processed blocks, the number of selected prediction modes being less than the number of said prescribed plurality of prediction modes;
- a predicting circuit which predicts a pixel of a block in an input frame image based on selected prediction modes;
- a calculating circuit which calculates a difference between said predicted pixel value and a pixel value of a block in an input frame; and
- a determining circuit which determines a coding mode based on the result of said calculation process.

28. A system comprising:
an image encoder comprising;
selecting circuit which selects prediction modes from among prescribed plurality of prediction modes based on processed blocks, the number of selected prediction modes being less than the number of said prescribed plurality of prediction modes;
predicting circuit which predicts a pixel of a block in an input frame image based on selected prediction modes;
calculating circuit which calculates a difference between said predicted pixel value and a pixel value of a block in an input frame;
determining circuit which determines a coding mode based on the result of said calculation by said calculating circuit, said determined coding mode being used for coding said image; and
image decoder which decodes a data encoded by said image encoder.

* * * * *